(12) United States Patent  
Bauer et al.

(10) Patent No.: US 7,831,354 B2
(45) Date of Patent: Nov. 9, 2010

(54) BODY STATE ESTIMATION OF A VEHICLE

(75) Inventors: Geoffrey Burke Bauer, Northville, MI (US); Kurt Stouffer Lehmann, Clarkston, MI (US); Brian L. Hildebrand, Goodrich, MI (US); Clinton Schumann, Royal Oak, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 110 days.

(21) Appl. No.: 10/807,088

(22) Filed: Mar. 23, 2004

(65) Prior Publication Data
US 2005/0216146 A1 Sep. 29, 2005

(51) Int. Cl.
*G06F 19/00* (2006.01)
(52) U.S. Cl. ............ 701/38; 73/514.01; 73/382 G; 73/514.02; 73/510; 73/504.03; 700/29; 700/30; 700/61
(58) Field of Classification Search ............ 701/38, 701/45, 4, 70, 36, 1, 34; 280/5.502, 735, 280/707, 840, 689, 714, 505.2; 180/282; 702/141; 73/514, 517 A, 514.01, 382 G, 73/514.02, 510, 511, 504.02, 504.03; 700/29, 700/30, 61
See application file for complete search history.

(56) References Cited

U.S. PATENT DOCUMENTS

| | | | | |
|---|---|---|---|---|
| 4,601,206 A | * | 7/1986 | Watson ............ | 73/510 |
| 4,865,347 A | * | 9/1989 | Fukushima et al. ...... | 280/5.508 |
| 5,098,119 A | * | 3/1992 | Williams et al. ......... | 280/5.507 |
| 5,383,363 A | * | 1/1995 | Kulmaczewski ............ | 73/510 |
| 5,383,680 A | * | 1/1995 | Bock et al. ............ | 280/5.503 |
| 5,396,423 A | * | 3/1995 | Fujimura et al. ............ | 701/38 |
| 5,742,918 A | | 4/1998 | Ashrafi et al. | |
| 5,742,919 A | | 4/1998 | Ashrafi et al. | |
| 5,787,375 A | | 7/1998 | Madau et al. | |
| 5,790,966 A | | 8/1998 | Madau et al. | |
| 5,809,434 A | | 9/1998 | Ashrafi et al. | |
| 5,852,787 A | | 12/1998 | Fodor et al. | |
| 5,948,027 A | | 9/1999 | Oliver, Jr. et al. | |
| 5,971,503 A | | 10/1999 | Joyce et al. | |
| 6,122,568 A | | 9/2000 | Madau et al. | |
| 6,128,955 A | * | 10/2000 | Mimura ............ | 73/510 |
| 6,158,274 A | | 12/2000 | Guo et al. | |
| 6,169,939 B1 | | 1/2001 | Raad et al. | |
| 6,220,095 B1 | | 4/2001 | Fennel et al. | |
| 6,233,505 B1 | | 5/2001 | Kranz et al. | |

(Continued)

FOREIGN PATENT DOCUMENTS

WO WO 97/47485 12/1997

(Continued)

*Primary Examiner*—Ronnie Mancho
(74) *Attorney, Agent, or Firm*—Brinks Hofer Gilson & Lione

(57) ABSTRACT

The present invention features a system and method for estimating body states of a vehicle. The system includes at least two sensors mounted to the vehicle. The sensors generate measured vehicle state signals corresponding to the dynamics of the vehicle. A signal adjuster transforms the measured vehicle states from a sensor coordinate system to a body coordinate system associated with the vehicle. A filter receives the transformed measured vehicle states from the signal adjuster and processes the measured signals into state estimates of the vehicle, such as, for example, the lateral velocity, yaw rate, roll angle, and roll rate of the vehicle.

14 Claims, 2 Drawing Sheets

U.S. PATENT DOCUMENTS

| | | |
|---|---|---|
| 6,249,721 B1 | 6/2001 | Lohberg et al. |
| 6,259,982 B1 * | 7/2001 | Williams et al. ............... 701/38 |
| 6,263,261 B1 | 7/2001 | Brown et al. |
| 6,282,474 B1 | 8/2001 | Chou et al. |
| 6,324,446 B1 | 11/2001 | Brown et al. |
| 6,327,526 B1 | 12/2001 | Hagan |
| 6,330,496 B1 | 12/2001 | Latarnik et al. |
| 6,332,104 B1 | 12/2001 | Brown et al. |
| 6,338,012 B2 | 1/2002 | Brown et al. |
| 6,347,541 B1 | 2/2002 | Maleki |
| 6,351,694 B1 | 2/2002 | Tseng et al. |
| 6,353,777 B1 | 3/2002 | Harmison et al. |
| 6,356,188 B1 | 3/2002 | Meyers et al. |
| 6,364,435 B1 | 4/2002 | Gronau et al. |
| 6,366,844 B1 | 4/2002 | Woywod et al. |
| 6,374,163 B1 | 4/2002 | Lou et al. |
| 6,397,127 B1 | 5/2002 | Meyers et al. |
| 6,409,286 B1 | 6/2002 | Fennel |
| 6,424,907 B1 | 7/2002 | Rieth et al. |
| 6,434,451 B1 | 8/2002 | Lohberg et al. |
| 6,435,626 B1 | 8/2002 | Kostadina |
| 6,438,464 B1 | 8/2002 | Woywod et al. |
| 6,471,218 B1 | 10/2002 | Burdock et al. |
| 6,477,480 B1 | 11/2002 | Tseng et al. |
| 6,496,758 B2 | 12/2002 | Rhode et al. |
| 6,526,334 B1 | 2/2003 | Latarnik et al. |
| 6,526,342 B1 | 2/2003 | Burdock et al. |
| 6,529,803 B2 | 3/2003 | Meyers et al. |
| 6,554,293 B1 | 4/2003 | Fennel et al. |
| 6,556,908 B1 | 4/2003 | Lu et al. |
| 6,593,849 B2 | 7/2003 | Chubb et al. |
| 6,614,343 B1 | 9/2003 | Fennel et al. |
| 6,631,317 B2 | 10/2003 | Lu et al. |
| 6,654,674 B2 | 11/2003 | Lu et al. |
| 6,671,595 B2 | 12/2003 | Lu et al. |
| 6,732,033 B2 * | 5/2004 | LaPlante et al. ............... 701/37 |
| 2001/0008986 A1 | 7/2001 | Brown et al. |
| 2002/0139599 A1 | 10/2002 | Lu et al. |
| 2003/0065430 A1 | 4/2003 | Lu et al. |
| 2003/0100979 A1 | 5/2003 | Lu et al. |
| 2003/0130775 A1 | 7/2003 | Lu et al. |
| 2003/0130778 A1 | 7/2003 | Hrovat et al. |
| 2004/0162654 A1 * | 8/2004 | Lu et al. ....................... 701/38 |
| 2005/0004721 A1 * | 1/2005 | Einthoven et al. .............. 701/4 |
| 2005/0102083 A1 * | 5/2005 | Xu et al. ...................... 701/70 |
| 2005/0114072 A1 * | 5/2005 | Choi .......................... 702/141 |
| 2005/0149240 A1 * | 7/2005 | Tseng et al. .................. 701/38 |

FOREIGN PATENT DOCUMENTS

| | | |
|---|---|---|
| WO | WO 99/30941 | 6/1999 |
| WO | WO 99/30942 | 6/1999 |
| WO | WO 00/03887 | 1/2000 |
| WO | WO 00/03900 | 1/2000 |
| WO | WO 01/12483 A1 | 2/2001 |
| WO | WO 02/36401 A1 | 3/2002 |
| WO | WO 02/100696 A1 | 12/2002 |
| WO | WO 03/002392 A1 | 1/2003 |

* cited by examiner

BODY STATE ESTIMATION OF A VEHICLE

BACKGROUND

This invention relates to a system and method of estimating body states of a vehicle.

Dynamic control systems have been recently introduced in automotive vehicles for measuring the body states of the vehicle and controlling the dynamics of the vehicle based on the measured body states. For example, certain dynamic stability control systems known broadly as control systems compare the desired direction of the vehicle based on the steering wheel angle, the direction of travel and other inputs, and control the yaw of the vehicle by controlling the braking effort at the various wheels of the vehicle. By regulating the amount of braking torque applied to each wheel, the desired direction of travel may be maintained. Commercial examples of such systems are known as dynamic stability program (DSP) or electronic stability program (ESP) systems.

Other systems measure vehicle characteristics to prevent vehicle rollover and for tilt control (or body roll). Tilt control maintains the vehicle body on a plane or nearly on a plane parallel to the road surface, and rollover control maintains the vehicle wheels on the road surface. Certain systems use a combination of yaw control and tilt control to maintain the vehicle body horizontal while turning. Commercial examples of these systems are known as active rollover prevention (ARP) and rollover stability control (RSC) systems.

Typically, such control systems referred here collectively as dynamic stability control systems use dedicated sensors that measure the yaw or roll of the vehicle. However, yaw rate and roll rate sensors are costly. Therefore, it would be desirable to use a general sensor to measure any body state of the vehicles, that is, a sensor that is not necessarily dedicated to measuring the roll or yaw of the vehicle.

BRIEF SUMMARY OF THE INVENTION

In general, the present invention features a system and method for estimating body states of a vehicle. The system includes at least two sensors mounted to the vehicle. The sensors generate measured signals corresponding to the dynamic state of the vehicle. A signal adjuster or signal conditioner transforms the measured vehicle states from a sensor coordinate system to a body coordinate system associated with the vehicle. A filter receives the transformed measured vehicle states from the signal adjuster and processes the measured signals into state estimates of the vehicle, such as, for example, the lateral velocity, yaw rate, roll angle, and roll rate of the vehicle.

The filter may include a model of the vehicle dynamics and a model of the sensors such that the states estimates are based on the transformed measured signals and the models of the vehicle dynamics and sensors. The filter may also include an estimator implemented with an algorithm that processes the transformed measured vehicle states and the models of the vehicle dynamics and sensors and generates the state estimates.

The present invention enables measuring the body states of a vehicle with various types of sensors that may not be as costly as dedicated roll or yaw rate sensors. For example, the sensors may all be linear accelerometers. However, in some implementations, it may be desirable to use an angular rate sensor in combination with linear accelerometers.

Other features and advantages will be apparent from the following drawings, detailed description and claims.

DETAILED DESCRIPTION

Figure 1:
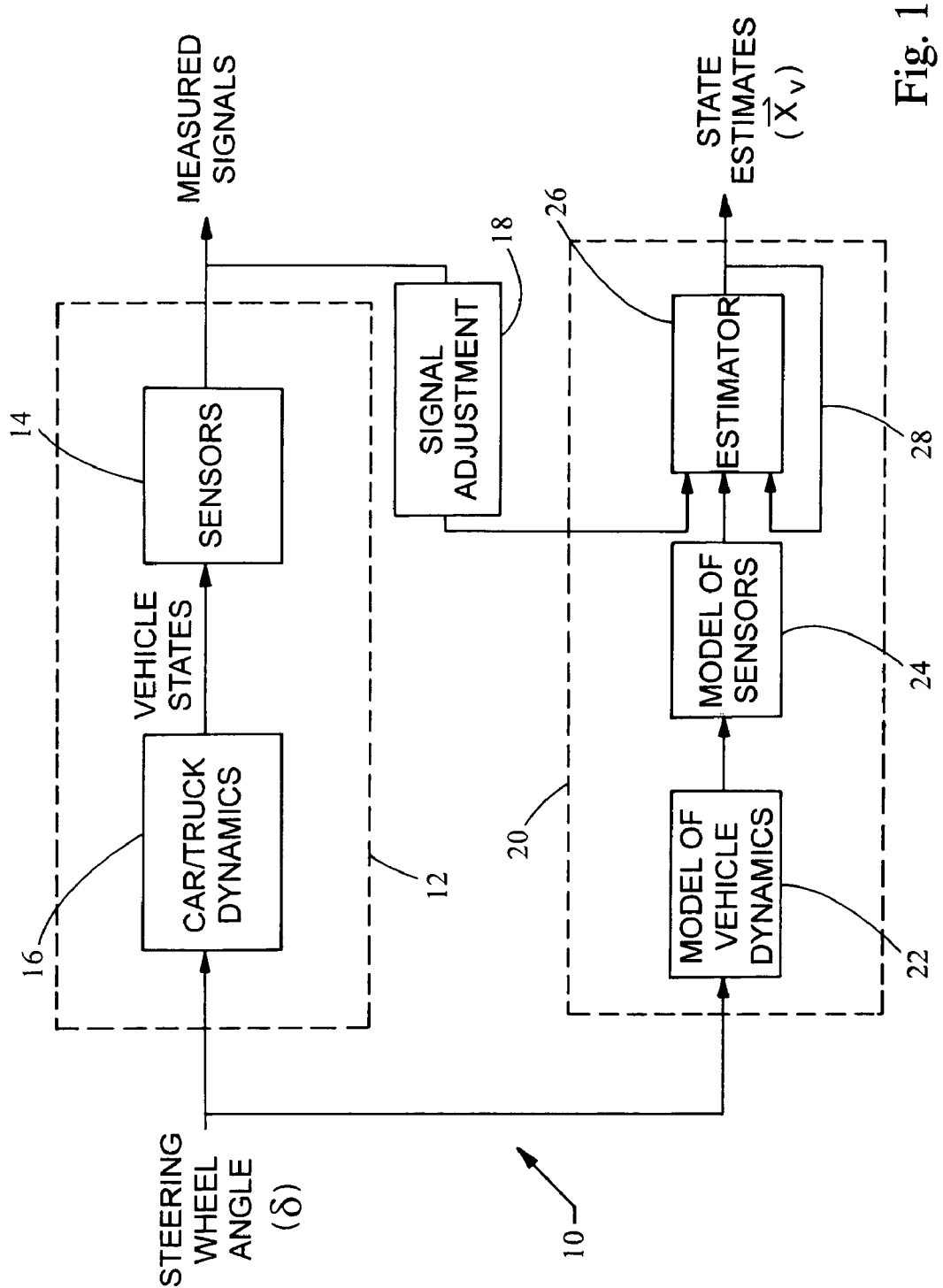
FIG. 1 depicts a block diagram of the processing of the vehicle states in accordance with the invention.

In accordance with an embodiment of the invention, FIG. 1 illustrates a system 10 that measures the vehicle states of a vehicle identified as block 12. Specifically, the system 10 includes a plurality of sensors 14 that measure signals which contain parts related to components of the vehicle states of the vehicle dynamics 16 produced, for example, when the angle of the steering wheel $\delta$ is changed.

The system 10 also includes a signal conditioner or adjuster 18 that receives measured signals from the sensors 14 and a filter 20 that receives the adjusted signals from the signal adjuster 18. In certain embodiments, the filter 20 is a Kalman filter including a model of the vehicle dynamics 22 and a model of the sensors 24. These models are described below in greater detail.

The signal adjuster 18 and the sensor model 24, which incorporates the model of the vehicle dynamics 22, provide inputs to an estimator 26. An algorithm with a feed back loop 28 is implemented in the estimator 26 to process the transformed signals with the models of the vehicle dynamics and the sensors. The output from the estimator 26 is the state estimates $\tilde{x}_v$. The body states estimates may include the roll angle, roll rate, yaw rate, and lateral velocity, as well as other body states.

In some embodiments, the sensors 14 measure the linear acceleration at a particular location where the sensor is mounted to the vehicle. When the sensors are not aligned in a plane perpendicular to the axis of interest, the measured values contain biases proportional to the angular rates about other axes. Similarly, when the measurement axes of the sensing devices are not coincident, the measured values contain biases proportional to the angular acceleration about other axes. Moreover, when the measurement axes of the sensing devices are not coincident and are not mounted along a body reference axis, the measured values contain unique gravity biases dependent upon the difference in mounting angle of the sensors and the body lean angle of the vehicle.

Figure 2:
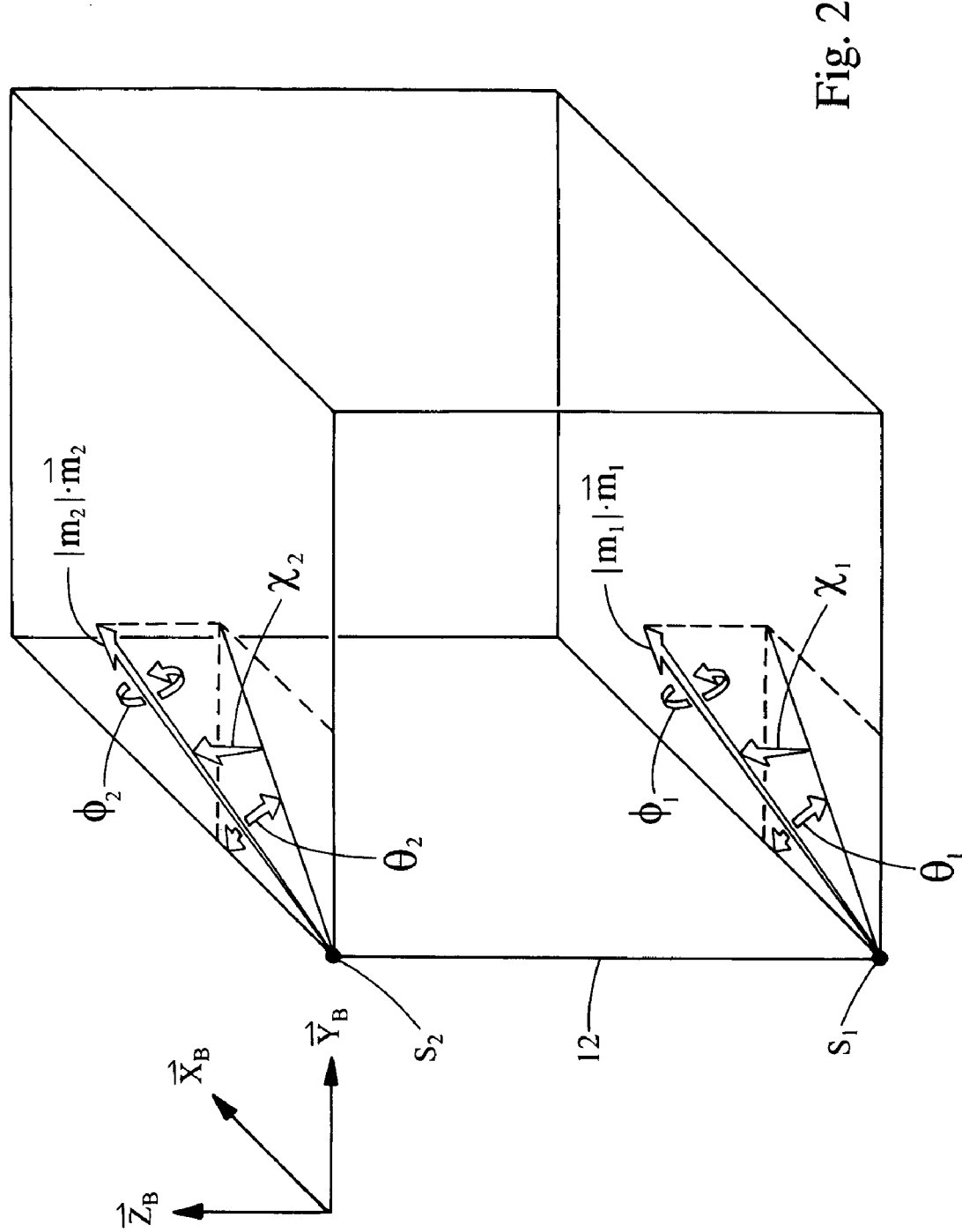
FIG. 2 depicts a general array of sensors for measuring body states of a vehicle.

To address these biases, a general implementation of the system 10 can be employed as illustrated in FIG. 2. Here the sensors 14 (identified individually as $S_1$ and $S_2$) are in known and fixed positions on the vehicle body 12 and the orientation of the measurement axes of the sensors $S_1$ and $S_2$ are known and fixed. Specifically, the location and orientation of a sensor $S_i$ is provided by the relation $$P_i(x_i, y_i, z_i, \theta_i, \chi_i, \phi_i), \qquad (1)$$

where $x_i, y_i, z_i$ are the space coordinates of the sensor $S_i$, $\theta_i$ is the sensor yaw angle, that is, the orientation of the sensor's measurement axis in the $X_B, Y_B$ plane with respect to the $X_B$ axis, $\chi_i$ is the sensor pitch angle, that is, the orientation of the sensor's measurement axis with respect to the $X_B, Y_B$ plane, and $\phi_i$ is the sensor roll angle, which is the rotation about the respective measurement axis.

The sensors $S_i$ measure the linear acceleration at the location Pi, namely, $\vec{\alpha}_i = \vec{m}_i \cdot |m_i| = [\alpha_{xi}, \alpha_{yi}, \alpha_{zi}]^T$, where $\vec{m}_i$ is the unit vector along the measurement axis, and $|m_i|$ is the magnitude of the acceleration along the measurement axis.

Since the acceleration $\vec{\alpha}_i$ measured by the sensor $S_i$ is the acceleration in the sensor coordinate system, the measured accelerations are transferred to a body coordinate system. In certain embodiments, it is assumed that in an array of single axis accelerometers each accelerometer has a measurement axis referred to as the $x_{sensor}$ axis. Accordingly, the transformation from the sensor coordinate system to the body coordinate system is provided by the expression $$\vec{a}_i \times \overline{Body}_i = \vec{a}_i \begin{bmatrix} x_{body,i} \\ y_{body,i} \\ z_{body,i} \end{bmatrix} = \begin{bmatrix} a_{x,body} \\ a_{y,body} \\ a_{z,body} \end{bmatrix} \quad (2)$$

where $\overline{Body}_i = \begin{bmatrix} x_{body,i} \\ y_{body,i} \\ z_{body,i} \end{bmatrix}$ $$= \begin{bmatrix} \theta_i^c \chi_i^c & -\theta_i^c \phi_i^c - \theta_i^c \chi_i^s \phi_i^s & \theta_i^s \phi_i^s + \theta_i^c \chi_i^s \phi_i^c \\ \theta_i^s \chi_i^c & \theta_i^c \phi_i^c + \theta_i^s \chi_i^s \phi_i^s & -\theta_i^c \phi_i^s - \theta_i^s \chi_i^s \phi_i^c \\ \chi_i^s & \chi_i^c \phi_i^s & \chi_i^c \phi_i^c \end{bmatrix} \cdot$$

$$\begin{bmatrix} x_{sensor} \\ y_{sensor} \\ z_{sensor} \end{bmatrix}$$

where $\_c = \cos(\_)$ $\_s = \sin(\_)$ $\theta_i$ = sensor_yaw_angle $\chi_i$ = sensor_pitch_angle $\phi_i$ = sensor_roll_angle and $[x_{sensor} \, y_{sensor} \, z_{sensor}]^T = [1 \, 0 \, 0]^T$, since $x_{sensor}$ is assumed to be the measurement axis for each of the single axis accelerometers.

Note that the transformation identified in Equation (2) is typically performed in the signal adjuster 18 (FIG. 1). The signal adjuster 18 may also provide a DC bias offset compensation to compensate for the biases discussed above.

Regarding the Kalman Filter 20, the model of the vehicle dynamics 22 for a state vector $$\vec{x}_v = [\dot{y}, r, \theta_v, \dot{\theta}_v]^T \quad (3)$$

is provided by the expression $$\dot{\vec{x}}_v = A \cdot \vec{x}_v + B \cdot \vec{u} \quad (4)$$

where
$$\begin{bmatrix} \ddot{y}_v \\ \dot{r}_v \\ \dot{\theta}_v \\ \ddot{\theta}_v \end{bmatrix} = \begin{bmatrix} -\dfrac{C_F + C_R}{mu} & \dfrac{C_R b - C_F a}{mu} - u & 0 & 0 \\ \dfrac{C_R b - C_F a}{I_z u} & \dfrac{-C_F a^2 + C_R b^2}{I_z u} & 0 & 0 \\ 0 & 0 & 0 & 1 \\ -\dfrac{h}{I_x u} & \dfrac{h(C_R b - C_F a - mu^2)}{I_x} & -\dfrac{K}{I_x} & -\dfrac{C}{I_x} \end{bmatrix} \quad (5)$$

$$\begin{bmatrix} \dot{y}_v \\ r_v \\ \theta_v \\ \dot{\theta}_v \end{bmatrix} + \begin{bmatrix} \dfrac{C_F}{m} & 0 \\ \dfrac{C_F a}{I_z} & 0 \\ 0 & 0 \\ \dfrac{C_F}{m} & 0 \end{bmatrix} \begin{bmatrix} \delta \\ g \end{bmatrix} \text{ and where}$$

$\dot{y}_v$ = lateral velocity of the vehicle
$r$ = yaw rate of the vehicle
$\theta_v$ = roll angle of the vehicle
$\dot{\theta}_v$ = roll rate of the vehicle
$C_F$ = cornering stiffness of the front axle
$C_R$ = cornering stiffness of the rear axle
$a$ = distance from center of gravity to the front axle
$b$ = distance from center of gravity to the rear axle
$m$ = mass of the vehicle
$h$ = height of the center of gravity above the roll axis
$I_z$ = yaw moment of inertia
$I_x$ = roll moment of inertia
$C$ = vehicle roll dampening
$K$ = vehicle roll stiffness
$u$ = longitudinal vehicle speed
$\delta$ = steering angle of the tires
$g$ = gravitational acceleration $$\dot{*} = \frac{d}{dt} *$$

and $\ddot{*} = \dfrac{d^2}{dt^2} *$

As for the model of the sensors 24, the model of laterally oriented sensors is provided by the expression $$A_{y,meas} = \ddot{y}_v + \dot{r}_v d_{xtoYA} + \ddot{\theta}_v d_{ztoRA} + r_v u \quad (6)$$

Accordingly, since $A_{y,meas} = \alpha_{y,body}$ from Equation (2), substituting the expressions for $\ddot{y}_v$, $\dot{r}_v$, $\ddot{\theta}_v$, and $r_v$ from Equation (5) into Equation (6) yields the expression $$a_{y,body} = \left[ a_{11} \dot{y}_v + a_{12} r_v + \frac{C_F}{m} \delta \right] + \quad (7)$$

$$\left[ a_{21} \dot{y}_v + a_{22} r_v + \frac{C_F a}{I_z} \delta \right] d_{xtoYA} +$$

$$\left[ a_{41} \dot{y}_v + a_{12} r_v + a_{43} \theta_v + a_{44} \dot{\theta}_v + \frac{C_F}{m} \delta \right] d_{ZtoRA} + r_v \cdot u$$

$$= [a_{11} + a_{21} d_{xtoYA} + a_{41} d_{ztoRA}] \dot{y}_v +$$

$$[a_{12} + a_{22} d_{xstoYA} + a_{42} d_{ztoRA} + u] r_v +$$

$$[a_{43} d_{ztoRA}] \theta_v +$$

$$[a_{44} d_{ztoRA}] \dot{\theta}_v +$$

-continued
$$\left[\frac{C_F}{m} + \frac{C_F a}{I_z} d_{xtoYA} + \frac{C_F}{m} d_{ztoRA}\right]\delta$$

where $\alpha_{kl}$ is the element in the k row and l column of the matrix A, $d_{xtoYA}$ is the distance along the x axis from a sensor to the yaw axis, and $d_{ztoRA}$ is the distance along the z axis from the sensor to the roll axis.

The model for vertically oriented sensors is $$A_{z,meas} = -g + \ddot{\theta}_v d_{ytoRA} \quad (8)$$

Hence, from Equations (2) and (5)

$$\begin{aligned}a_{z,body} &= -g + \left[a_{41}\dot{y}_v + a_{42}r_v + a_{43}\theta_v + a_{44}\dot{\theta}_v + \frac{C_F}{m}\delta\right]d_{ytoRA} \\ &= \lfloor a_{41}d_{ytoRA}\rfloor \dot{y}_v + \\ &\quad \lfloor a_{42}d_{ytoRA}\rfloor r_v + \\ &\quad \lfloor a_{43}d_{ytoRA}\rfloor \theta_v + \\ &\quad [a_{44}d_{ytoRA}]\dot{\theta}_v + \\ &\quad \left[\frac{C_F}{m}d_{ytoRA}\right]\delta + \\ &\quad [-g]\end{aligned} \quad (9)$$

where $d_{ytoRA}$ is the distance along the y axis to the roll axis.

And for longitudinally oriented sensors, the sensor model is provided by the expression $$A_{x,meas} = -\dot{r}_v d_{ytoYA} \quad (10)$$

such that upon employing Equations (2) and (5), Equation (10) becomes $$a_{x,body} = -a_{21}d_{dtoYA}\dot{y} - a_{22}d_{dytoYA}r_v - b_{21}d_{ytoYA}\delta \quad (11)$$

where $d_{dytoYA}$ is the distance along the y axis to the yaw axis and $b_{21}$ is the element in the second row and first column of the matrix B.

The algorithm implemented in the estimator 26 processes the expressions from Equations (7), (9), and (11) through a filter (an estimation algorithm) to provide the estimates for the state vector $\vec{x}_v = [\dot{y}_v\ r_v\ \theta_v\ \dot{\theta}_v]^T$.

Note that the above discussion is directed to obtaining a solution for the state vector $\vec{x}_v$ in continuous time. Therefore, $\vec{x}_v$ is typically discretized according to the expression $$\vec{x}_v(k+1) = A_d \vec{x}_v(k) + B_d \vec{u}(k) \quad (12)$$

where k identifies the $k^{th}$ time step and the matrices A and B can be discretized according to the approximations $$A_d = I_n + \Delta_k \cdot A$$

and $$B_d = \Delta_k \cdot B$$

where $I_n$ is the nth order identity matrix, which in this case is a fourth order identity matrix, and $\Delta_k$ is the time step.

Although the above embodiment is directed to a sensor set with linear accelerometers, hybrid-sensor-sets are contemplated. For example, an angular rate sensor can be used in the vehicle 12 and a model of that sensor can be used in the "Kalman Filter" box 20. Specifically, for a yaw rate sensor, the model is [0 1 0 0], that is, the sensor measures yaw rate and nothing else.

Hence, in stability control, in which measuring yaw rate and roll rate/angle is useful, four accelerometers can be used for the sensors 14. Alternatively, for a hybrid system, two accelerometers and an angular rate sensor may be employed. Other examples of hybrid systems include, but are not limited to, two lateral and two vertical accelerometers; two lateral, two longitudinal, and two vertical accelerometers; and two lateral, two vertical accelerometers, and an angular rate sensor.

Other embodiments are within the scope of the claims.

What is claimed is:

1. A system for estimating body states of a vehicle comprising:

a first linear accelerometer and a second linear accelerometer mounted to the vehicle in separate locations from each other, the first and second linear accelerometers being configured to measure the acceleration of the vehicle in a first direction and generate measured first and second linear acceleration signals based on the acceleration of the vehicle in the first direction, the measured first and second linear acceleration signals defining a first set of linear acceleration signals;

a third linear accelerometer and a fourth linear accelerometer mounted to the vehicle in separate locations from each other, the third and fourth linear accelerometers being configured to measure the acceleration of the vehicle in a second direction and generate measured third and fourth linear acceleration signals based on the acceleration of the vehicle in the second direction, wherein the second direction is different from the first direction, the measured third and fourth linear acceleration signals defining a second set of linear acceleration signals;

a signal adjuster configured to transform the first and second sets of linear acceleration signals from a sensor coordinate system to a body coordinate system associated with the vehicle; and an estimating filter configured to receive the transformed first and second sets of linear acceleration signals from the signal adjuster and process at least one of the transformed first and second sets of linear acceleration signals into at least one of a roll rate, a roll angle and a yaw rate, based on at least one of the following equations:

$$A_{y,meas} = \ddot{y}_v + \dot{r}_v d_{xtoYA} + \ddot{\theta}_v d_{ztoRA} + r_v u; \quad \text{a)}$$

$$A_{z,meas} = -g + \ddot{\theta}_v d_{ytoRA}; \text{ and} \quad \text{b)}$$

$$A_{x,meas} = -\dot{r}_v d_{ytoYA}, \quad \text{c)}$$

where:
$A_{x,meas}$ = acceleration in an x-direction;
$A_{y,meas}$ = acceleration in a y-direction;
$A_{z,meas}$ = acceleration in a z-direction;
$\ddot{y}_v$ = lateral acceleration of the vehicle;
$\dot{r}_v$ = angular acceleration about a yaw axis of the vehicle;
$d_{xtoYA}$ = the distance along the x axis from one of the linear accelerometers to the yaw axis of the vehicle;
$\ddot{\theta}_v$ = angular acceleration about a roll axis of the vehicle;
$d_{ztoRA}$ = the distance along the z axis from one of the linear accelerometers to the roll axis of the vehicle;
$r_v$ = yaw rate of the vehicle;
u = longitudinal vehicle speed;

g=gravitational acceleration;

$d_{ytoRA}$=the distance along the y axis from one of the linear accelerometers to the roll axis of the vehicle; and $d_{ytoYA}$=the distance along the y axis from one of the linear accelerometers to the yaw axis.

2. The system of claim 1 wherein the filter includes a model of the vehicle dynamics and a model of the linear accelerometers, the at least one of a roll rate, a roll angle and a yaw rate being based on the at least one of the transformed first and second sets of linear acceleration signals and the models of the vehicle dynamics and linear accelerometers.

3. The system of claim 2 wherein the filter includes an estimator, an algorithm being implemented in the estimator to process the at least one of the transformed first and second sets of linear acceleration signals and the models of the vehicle dynamics and linear accelerometers and generate the at least one of a roll rate, a roll angle and a yaw rate.

4. The system of claim 1 further comprising an angular rate sensor.

5. The system of claim 1 further comprising two linear accelerometers that measure accelerations in a third direction, wherein the third direction is different from the first and second directions.

6. The system of claim 1 further comprising two linear accelerometers that measure the vertical accelerations of the vehicle.

7. The system of claim 1 wherein the signal adjuster further provides compensation for gravity biases associated with the linear accelerometers.

8. A system for estimating body states of a vehicle comprising:

a first linear accelerometer and a second linear accelerometer mounted to the vehicle in separate locations from each other, the first and second linear accelerometers being configured to measure the acceleration of the vehicle in a first direction and generate measured first and second linear acceleration signals based on the acceleration of the vehicle in the first direction, the measured first and second linear acceleration signals defining a first set of linear acceleration signals;

a third linear accelerometer and a fourth linear accelerometer mounted to the vehicle in separate locations from each other, the third and fourth linear accelerometers being configured to measure the acceleration of the vehicle in a second direction and generate measured third and fourth linear acceleration signals based on the acceleration of the vehicle in the second direction, wherein the second direction is different from the first direction, the measured third and fourth linear acceleration signals defining a second set of linear acceleration signals; and a filter configured to process the first and second sets of linear acceleration signals using a model to generate at least one of a roll angle, a roll rate, and a yaw rate, the model being a model of the vehicle dynamics and the linear accelerometers, the model being based in part on distances along at least one of an x-axis, a y-axis, and a z-axis from each of the linear accelerometers to at least one of a yaw axis and a roll axis of the vehicle, the first linear accelerometer being located a first distance from the center of gravity of the vehicle, and the second linear accelerometer being located a second distance from the center of gravity of the vehicle, the third linear accelerometer being located a third distance from the center of gravity of the vehicle, and the fourth linear accelerometer being located a fourth distance from the center of gravity of the vehicle, wherein the model is based on at least one of the following equations:

a) $A_{y,meas} = \ddot{y}_v + \dot{r}_v d_{xtoYA} + \ddot{\theta}_v d_{ztoRA} + r_v u;$ b) $A_{z,meas} = -g + \ddot{\theta}_v d_{ytoRA};$ and c) $A_{x,meas} = -\dot{r}_v d_{ytoYA},$ where:

$A_{x,meas}$=acceleration in an x-direction;

$A_{y,meas}$=acceleration in a y-direction;

$A_{z,meas}$=acceleration in a z-direction;

$\ddot{y}_v$=lateral acceleration of the vehicle;

$\dot{r}_v$=angular acceleration about a yaw axis of the vehicle;

$d_{xtoYA}$=the distance along the x axis from one of the linear accelerometers to the yaw axis of the vehicle;

$\ddot{\theta}_v$=angular acceleration about a roll axis of the vehicle;

$d_{ztoRA}$=the distance along the z axis from one of the linear accelerometers to the roll axis of the vehicle;

$r_v$=yaw rate of the vehicle;

u=longitudinal vehicle speed;

g=gravitational acceleration;

$d_{ytoRA}$=the distance along the y axis from one of the linear accelerometers to the roll axis of the vehicle; and $d_{ytoYA}$=the distance along the y axis from one of the linear accelerometers to the yaw axis.

9. The system of claim 8, the filter further comprising an estimator configured to implement an algorithm having a feedback loop to process the first and second sets of linear acceleration signals using the model, the estimator being further configured to output the at least one of a roll angle, a roll rate, and a yaw rate.

10. The system of claim 8, further comprising a signal adjuster configured to transform the first and second sets of linear acceleration signals from a sensor coordinate system to a body coordinate system associated with the vehicle.

11. The system of claim 10 wherein the signal adjuster provides compensation for gravity biases associated with the linear accelerometers.

12. The system of claim 8 further comprising two linear accelerometers that measure accelerations in a third direction, wherein the third direction is different from the first and second directions.

13. The system of claim 8 further comprising two linear accelerometers that measure vertical accelerations of the vehicle.

14. The system of claim 8 further comprising an angular rate sensor.

* * * * *